2 Sheets--Sheet 1.

W. K. GREENE, Jr. dec'd. & W. M. PAWLING.

JANE M. GREENE Ex'trx., of W. K. GREENE, Jr. Dec'd.

Machine for Drying Tubular Knit Fabrics.

No. 6,587. Reissued Aug. 10, 1875.

Witnesses:
W. Davidson Jones
Jas L. Voorhies

Wm K. Greene Dec.
Jane M. Greene Executrix,
Wm M. Pawling

2 Sheets--Sheet 2.
W. K. GREENE, Jr. dec'd. & W. M. PAWLING.
JANE M. GREENE Ex'trx., of W. K. GREENE, Jr. Dec'd.
Machine for Drying Tubular Knit Fabrics.
Reissued Aug. 10, 1875.
No. 6,587.
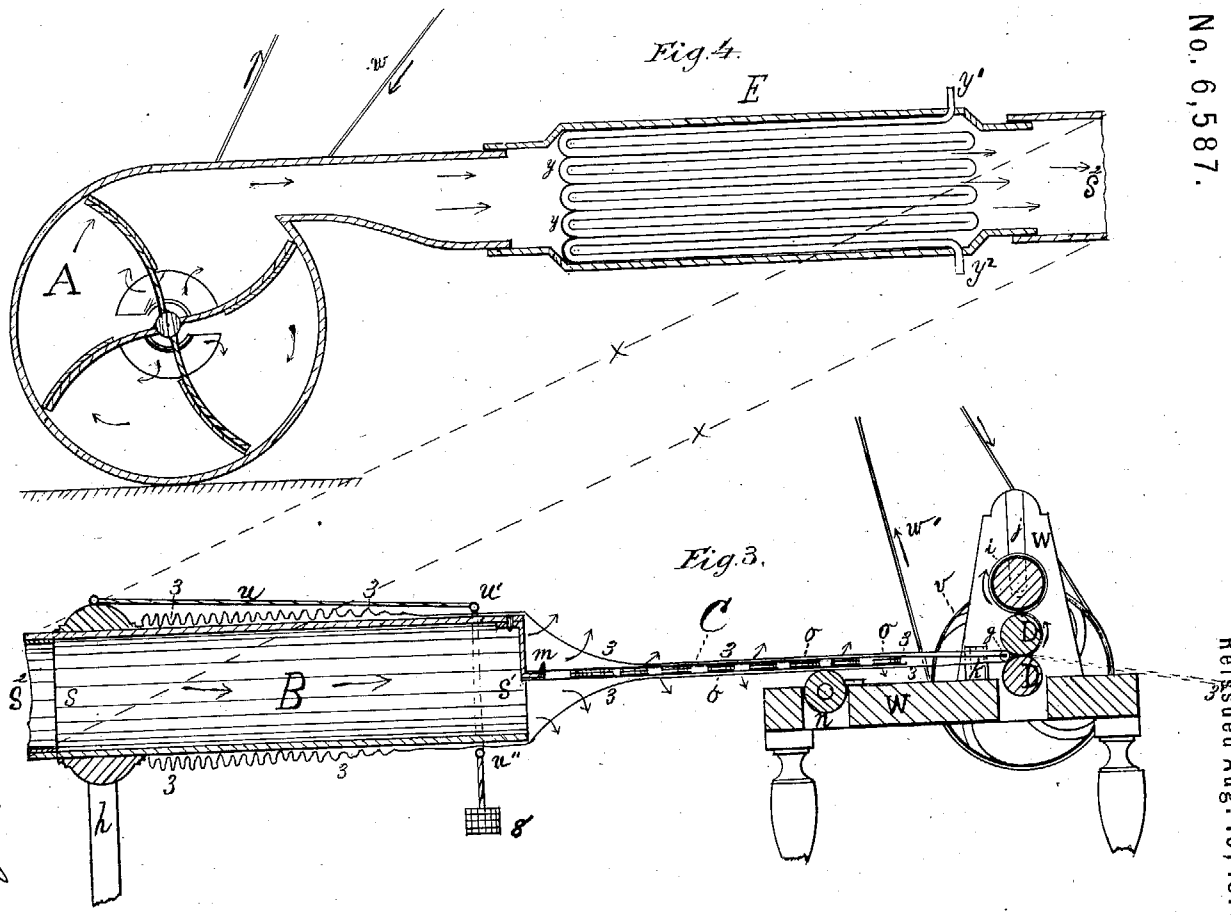
Witnesses:
W. Davidson Jones
Jas L. Voorhees
Wm K. Greene Dec'd
Jane M Greene Executrix,
Wm M Pawling

UNITED STATES PATENT OFFICE

JANE M. GREENE, OF AMSTERDAM, EXECUTRIX OF WILLIAM K. GREENE, JR., DECEASED, AND WILLIAM M. PAWLING, OF HAGAMAN'S MILLS, N. Y.

IMPROVEMENT IN MACHINES FOR DRYING TUBULAR KNIT FABRICS.

Specification forming part of Letters Patent No. 37,288, dated January 6, 1863; reissue No. 6,587, dated August 10, 1875; application filed July 28, 1875.

DIVISION A.

*To all whom it may concern:*

Be it known that WILLIAM K. GREENE, Jr., deceased, late of Amsterdam, county of Montgomery and State of New York, and WILLIAM M. PAWLING, of Hagaman's Mills, county and State above written, did jointly invent a new and useful Improvement in Machinery for Drying and Finishing Tubular Knit Fabrics, which improvement was secured by Letters Patent to the above named GREENE and PAWLING, January 6, 1863, No. 37,288; and be it further known that we, JANE M. GREENE, executrix, &c., of the said WILLIAM K. GREENE, Jr., deceased, of Amsterdam, and WILLIAM M. PAWLING, of Hagaman's Mills, each of the county and State first above written, do hereby declare the following to be a full, clear, and exact description of the same, reference being had to the accompanying drawings, making part of this specification, in which—

Figure 2:
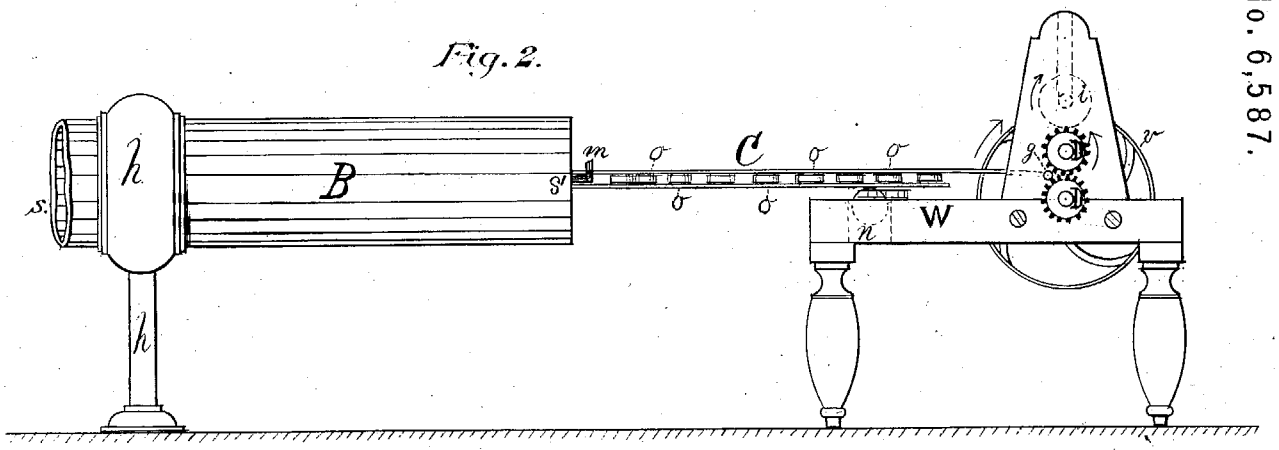
Figure 1:
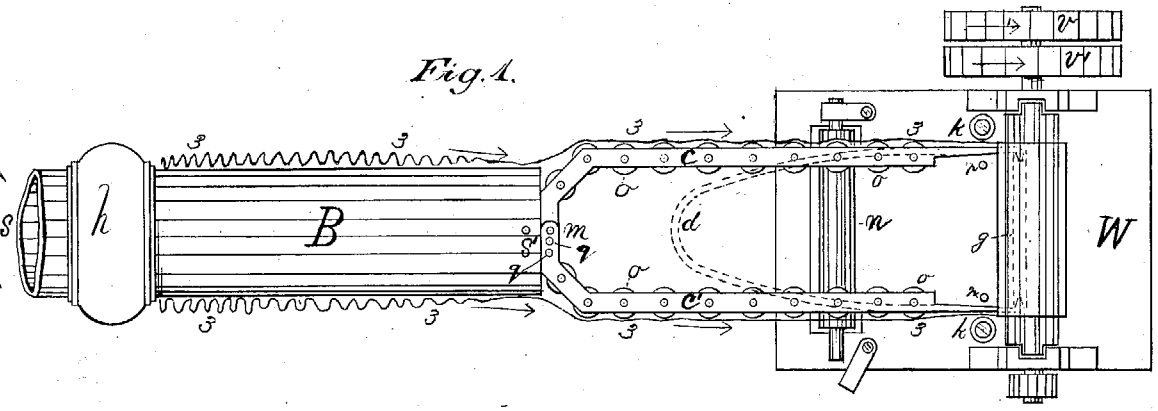

Figure 1 is a plan of a section thereof. Fig. 2 is a side elevation of Fig. 1; and Figs. 3 and 4, connected together as indicated by the broken lines *x x*, is a central vertical longitudinal sectional elevation of all the parts, and showing the fan-blower, which is omitted in Figs. 1 and 2.

Like letters and figures of reference indicate like parts in each figure, and the arrows indicate the direction of motion of the machinery and knit fabric, and of the current of air.

The object of this invention is to rapidly dry and finish uniformly and evenly long wet pieces of tubular knit fabric, by the use of a fan-blower or other suitable means for producing a blast or current of air, a hollow tubular web-support to receive and support the long piece of tubular knit fabric, said tube being held firmly in position at the end nearest to the blower by a suitable device, the outer or long end projecting in the direction of the current of air from the blower, thereby conveying the air into the internal part of the long tubular knit web, while the tubular web is gradually and evenly drawn from said tube or web support over and around a suitable adjustable spreader of a flattened form, by a pair of draft-rollers or any other suitable drawing-off mechanism. The long piece of knitted tubular fabric is thus dried and properly stretched laterally and lengthwise, and is then disposed of by winding it into a roll.

To facilitate the process of drying the tubular knitted fabric, we interpose between the blower and the tube or web support a case containing a coil of steam-pipe. Air from the blower, by passing over and around these steam-heated pipes, becomes sufficiently heated before passing into the web-support and the internal part of the knitted fabric to add greatly to the effectiveness of the machine.

In the drawings, Fig. 4, A is a fan-blower, driven by belt *w*, producing a current of air. E is an air-heating chamber, containing the steam-pipes *y y*, having an induction-pipe at $y^1$ communicating with a steam-generator, and an eduction-pipe, $y^2$, to allow the condensed water to escape. The air driven into the chamber E passes over and around the coil of steam-heated pipes *y y*, and is thereby heated before it escapes at $s^2$ $s^2$. B is a long hollow tube, firmly supported in the standard *h h* at or near the rear end, leaving its long forward part projecting in the direction of the current of air from the blower A and heater E. The tube B is provided with a cord, *u*, extending from the top of the standard *h h* to near the forward part of said tube, as shown, and looped at *w'*, the double looped cord extending around the tube B to the under side, as shown at *w''*, to which is attached a weight, 8, the use of which will more fully hereinafter appear. On the upper part of the outer end of tube or web support B is firmly secured a hook, *m*. C, Fig. 3, is an internal web expander or spreader, constructed in two parts, *c c'*, each with a series of holes, *q q*, Fig. 1, and made adjustable to tubular knit fabrics of different diameters, by shifting the parts *c c'* upon the hook *m*, and substituting a roll, *g*, corresponding to the change in the diameter of the fabric. *o o o o o* are friction-rollers attached to the spreader C, to relieve the web of friction while being passed over the spreader.

*d* is another form of internal web expander or spreader, made in the form substantially as shown by dotted lines, with the ends turned in and held apart by the roll *g*, Figs. 1, 2, and 3, said roll *g* remaining, when in use, near or in the bite of the rollers D D. With this form of spreader it is necessary to have one of proper width for each piece of tubular fabric of different diameter. W W is a wooden frame substantially as shown, Figs. 1, 2, and 3, whereon are mounted the draw-off rollers D D, tight and loose pulleys *v v'*, the web-expander supporting-roll *n*, the incumbent take-up roll *i*, and the side guides *k k*, which may be set in the different holes *r r*, to accommodate different diameters of knit fabric.

The operation of this invention is as follows: The parts being connected as indicated by the dotted or broken lines *x x* in Figs. 3 and 4, the spreader C is removed from its place by unhooking it from the hook *m*, the weight 8 is removed from the looped cord at *w''*, and the loop removed, leaving the tube free to receive the tubular cloth. One of the newly-washed pieces of tubular knit goods is taken in such damp or wet condition, and the end is placed around and sleeve-like over the end of the tube B at $s^1$, and is slipped on lengthwise, pressing the fabric to the rear end close to the standard *h h*, and covering the tube nearly up to the looped cord *w'*, the cloth being thereby in a shirred or gathered condition, as shown in Figs. 1 and 3. The spreader C is then returned to its proper condition, with the rear end containing the small roll *g* within a short distance of the bite of the draft-rollers D D. The end of the fabric is then drawn over the spreader C a short distance, and the looped cord and weight 8 are replaced in their proper position, as shown in Fig. 3. From a steam-generator steam is introduced into the coil of steam-pipe *y y* in chamber E, through a stop-cock at $y^1$, and the condensed water is drawn through a stop-cock at $y^2$. Rapid motion is given to the blower A, thereby driving a current of air through the heater E, connecting-pipe $s^2$ $s^2$, and the hollow web support or tube B, into that portion of the fabric drawn partly over the spreader C, thereby drying the end which would remain wet or damp if introduced immediately into the drawing-off mechanism. The belt *w'* is passed from the loose pulley *v* to the tight pulley *v'*, thereby giving proper motion to the draft-rollers D D. The end of the web is drawn forward over the spreader, and introduced to the action of the rollers D D, which close up the end of the tubular web, causing the heated air to pass out through the pores or meshes of the web in all directions, as indicated by the arrows in Fig. 3, and thereby thoroughly drying the fabric as it is stretched laterally by the internal web-expander C, and longitudinally by the joint action of the draw-off rollers and the friction created by the looped cord *u u' u''* and weight 8.

As the tubular web is gradually drawn off from the tube B and over spreader C, and dried by the internal blast or current of air, and closed together by the rollers D D, it may be wound upon the incumbent take-up roll *i*, which is revolved by the friction with the upper roller D, and secured in position by the guideways *j j*, Fig. 3, which allow it to rise as the roll of goods increases in diameter; or the cloth may, after being closed up by the action of the rollers D D, pass in the line of discharge, as indicated by the broken lines 3'.

With this invention a tubular knit fabric, many yards long, can be dried rapidly and evenly and of uniform width.

What we claim, and desire to secure by Letters Patent, is—

The combination of a hollow tubular web-support, an internal web expander or spreader, and a mechanism for producing a current of air, all operating together substantially as shown and described.

JANE M. GREENE,
*Executrix, &c., of William K. Greene, Jr., decd.*
WM. M. PAWLING.

Witnesses:
W. DAVIDSON JONES,
JAS. L. VOORHEES.